Patented Sept. 23, 1952

2,611,758

UNITED STATES PATENT OFFICE 2,611,758

STEAM RESISTANT ISOOLEFIN-DIOLEFIN COPOLYMER RUBBERY COMPOSITION

Donald V. Sarbach, Cuyahoga Falls, Ohio, assignor to The B. F. Goodrich Company, New York, N. Y., a corporation of New York No Drawing. Application October 1, 1948, Serial No. 52,420

3 Claims. (Cl. 260—45.5)

This invention relates to a steam-resistant rubbery composition and the method of making same, and is particularly concerned with imparting steam-resistance to a rubbery composition composed predominantly of a rubbery isoolefin-diolefin copolymer and the method of making such composition.

It is often desirable to make rubbery articles for use where the article will be subjected to elevated temperatures repeatedly and for extended periods of time. Some of the more common articles of this kind include steam hose and vulcanizing bags for tires. The problem of preparing a serviceable vulcanized rubber composition is aggravated where the article is subjected to superheated steam under elevated pressure since, in addition to the normal heat aging, the usual rubber becomes porous and spongy from action of the steam and finally disintegrates.

The rubbery isoolefin - diolefin copolymers, known commercially as "Butyl" rubber, have proven to have excellent resistance to heat aging. These copolymers, however, are rapidly deteriorated by the action of superheated steam.

It is, therefore, an object of this invention to provide a rubbery composition which possesses the desirable physical properties of the rubbery isoolefin-diolefin copolymer and which additionally possesses marked steam resistance.

I have discovered that steam resistance is imparted to a rubbery composition comprising a rubbery isoolefin-diolefin copolymer by incorporating into said composition a small amount of rubber material comprising a polymer of an acrylic nitrile. The polymer of acrylic nitrile may be in the form of a copolymer of chloroprene and an acrylic nitrile, in which case it can be blended directly with the isoolefin-diolefin copolymer; but the polymer is preferably the copolymer of an acrylic nitrile with a butadiene hydrocarbon. These latter copolymers are immiscible with the isoolefin-diolefin copolymers and cannot be blended therewith directly. I have discovered, however, that the butadiene-acrylic nitrile copolymers may be readily blended with a rubbery chloroprene polymer, and that the resulting mixture blends well with the rubbery isoolefin-diolefin copolymer to form a homogeneous blended rubbery composition.

The desired steam-resistant composition in accordance with this invention comprises 80 to 99 parts by weight of rubbery isoolefin-diolefin copolymer and 1 to 20 parts by weight of rubber material comprising a polymer of an acrylic nitrile. Where a copolymer of a butadiene hydrocarbon and an acrylic nitrile is first blended with a rubbery chloroprene polymer, and the resulting mixture is blended into the rubbery isoolefin - diolefin copolymer, the composition preferably comprises from 80 to 99 parts by weight of the rubbery isoolefin-diolefin copolymer, ½ to 10 parts by weight of the rubbery copolymer of a butadiene hydrocarbon with an acrylic nitrile, and from ½ to 10 parts by weight of the rubbery chloroprene polymer in a composition comprising a total of 100 parts by weight of rubber material. Such compositions possess the desired physical properties of the rubbery isoolefin-diolefin copolymer substantially undiminished and in addition possess excellent resistance to deterioration by superheated steam.

The rubbery isoolefin - diolefin copolymers which are included in this invention and referred to as "Butyl" rubber are those rubbery plastic hydrocarbon copolymers prepared by the low temperature copolymerization of a major proportion of an isoolefin with a minor proportion of an open-chain conjugated diolefin according to the usual methods of copolymerizing such monomers as disclosed in detail in U. S. Patents 2,356,128; 2,356,129; and 2,356,130 to Thomas and Sparks. The copolymers are commonly prepared by copolymerizing a major proportion of an isoolefin having from 4 to 7 carbon atoms with a minor proportion of an open-chain conjugated diolefin having from 4 to 8 carbon atoms, and the copolymer is desirably the copolymer of a major proportion of isobutylene with the minor proportion of isoprene. Preferably, the copolymer comprises from 70 or 80 to 99½ parts by weight of an isomonoolefin such as isobutylene or ethyl methyl ethylene copolymerized with ½ to 20 or 30 parts by weight of an open-chain aliphatic conjugated diolefin such as isoprene; butadiene-1,3; piperylene; 2,3-dimethyl butadiene-1,3; 1,2-dimethyl butadiene-1,3; 1,3-dimethyl butadiene-1,3; 1-ethyl butadiene-1,3; 1,4-dimethyl butadiene-1,3 and the like; the total monomeric material in the preferred mixture amounting to 100 parts by weight. Typical examples of these synthetic rubbers are known to the trade as "GR–I," "Butyl A," "Butyl B," "Butyl C" and "Flexon."

The acrylic nitrile polymer which is blended with the "Butyl" rubber to impart steam resistance thereto may be any of the rubbery polymers of any acrylic nitrile. Such acrylic nitriles which may be used are the nitriles of an alpha methylene unsaturated monocarboxylic acid and preferably the acrylic nitriles having the structure

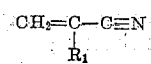

wherein $R_1$ is a member of the class consisting of hydrogen and an alkyl radical. Thus, it may be the rubbery copolymer prepared by copolymerizing chloroprene, i. e., 2-chlorobutadiene-1,3, with a lesser amount by weight of an acrylic nitrile such as acrylonitrile or methacrylonitrile and desirably the copolymer of from 55 to 80 parts by weight of chloroprene with 20 to 45 parts by weight of an acrylic nitrile. Preferably, the acrylic nitrile polymer employed in practising the invention is a rubbery copolymer of a butadiene-1,3 hydrocarbon with a lesser amount by weight of an acrylic nitrile. The copolymers which are desirably used are prepared by polymerizing from 55 to 80 parts by weight of a butadiene-1,3 hydrocarbon, such as butadiene-1,3; piperylene; isoprene; 2,3-dimethyl butadiene-1,3; 1,2-dimethyl butadiene-1,3; 1,3-dimethyl butadiene-1,3; 1-ethyl butadiene-1,3; 1,4-dimethyl butadiene-1,3 and the like, with from 20 to 45 parts by weight of an acrylic nitrile, preferably one having the structure

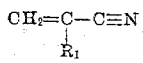

wherein $R_1$ is a member of the class consisting of hydrogen and a methyl group such as acrylonitrile and methacrylonitrile; the total weight of the monomers in the polymerization mixture being 100 parts by weight. Particularly suitable copolymers are the copolymers of butadiene-1,3 and acrylonitrile in the ratio of 50:45 parts by weight, 67:33 parts by weight and 75:25 parts by weight.

The copolymer of a butadiene hydrocarbon and an acrylic nitrile may be blended, prior to incorporation into the "Butyl" rubber, with any of the well-known rubbery polymers of a chlorobutadiene-1,3 monomer including the rubbery copolymer prepared by copolymerizing such monomers as 2-chlorobutadiene-1,3 or 2,3-dichlorobutadiene-1,3 with a lesser amount by weight of an ethylenic monomer copolymerizable therewith such as isoprene, butadiene-1,3 and the like, preferably in the ratio of 55 to 100 parts by weight of the chlorobutadiene-1,3 monomer with from 0 to 45 parts by weight of the copolymerizable ethylenic monomer. The chlorobutadiene-1,3 polymer which is desirably used is the rubbery homopolymer of chloroprene itself.

The acrylic nitrile polymer and the chlorobutadiene polymer blend readily to form a homogeneous mixture, and the mixing may be carried out by any of the well-known methods for blending rubbery materials such as by mill mixing the polymers or blending them in an internal mixer such as a Banbury mixer.

The resulting mixture may then be blended with the rubbery isoolefin-diolefin copolymer to form a smooth homogeneous composition with no tendency toward separation of the acrylic nitrile copolymer. At the same time, the rubbery components are compounded with the usual compounding ingredients for rubber material such as vulcanizing agents and accelerators therefor, reinforcing agents, fillers, antioxidants, softeners, etc., in the amounts and proportions in accordance with conventional compounding practices. It should be noted that the composition is vulcanized with from 1% to 10% of sulfur based on the total weight of the rubbery constituents therein with best results being obtained using 3% to 10% of sulfur by weight.

The rubbery composition containing the desired compounding ingredients is then formed into the desired rubbery article such as steam hose, tire vulcanizing bags, and the like, and the article is vulcanized in the usual manner by means of heat and pressure.

The invention is best illustrated by reference to a specific embodiment thereof and a comparison of the specific composition with a conventional composition. It will be understood that the following example is merely illustrative and it is not intended that the scope of the invention be limited thereby.

Vulcanizing bags for tires, due to repeated exposure to superheated steam, commonly crack badly after a short time and then disintegrate altogether. One of the most effective compositions for use in making such bags, prior to this invention, had the following formulation:

| Material | Parts by Weight |
|---|---|
| 80:20 Isobutylene-Isoprene Copolymer | 100.0 |
| Zinc Oxide | 5.0 |
| Carbon Black | 50.0 |
| Sulfur | 2.0 |
| Stearic Acid | 1.5 |
| 2-Mercaptobenzothiazole | 0.5 |
| Tetraethyl Thiuram Disulfide | 1.5 |
| Total | 160.5 |

This composition is mixed in accordance with conventional rubber processing techniques, formed into a tire vulcanizing bag, and vulcanized by heating the bag for 30 minutes at 307°.

*Example*

A composition embodying the present invention is prepared as follows. The rubbery copolymer of 55 parts by weight of butadiene-1,3 with 45 parts by weight of acrylonitrile is milled with an equal amount by weight of rubbery polychloroprene. A portion of the resulting rubbery mixture is then mixed on a mill with a body of "Butyl" rubber and appropriate compounding ingredients in accordance with the following recipe:

| Material | Parts by Weight |
|---|---|
| 80:20 Isobutylene-Isoprene Copolymer | 96.0 |
| Mixture of Polychloroprene and Butadiene-Acrylonitrile Copolymer | 4.0 |
| Zinc Oxide | 5.0 |
| Carbon Black | 50.0 |
| Sulfur | 2.0 |
| Stearic Acid | 1.5 |
| 2-Mercaptobenzothiazole | 0.5 |
| Tetraethyl Thiuram Disulfide | 1.5 |
| Total | 160.5 |

The resulting composition is formed into a tire vulcanizing bag and vulcanized as hereinabove by heating the composition for 30 minutes at 307° F. Thus, the only difference between the compositions is the replacement of 4.0 parts by weight of the isobutylene-isoprene copolymer with 4.0 parts by weight of the chloroprene-acrylic nitrile copolymer blend.

Both bags were subjected to superheated steam (135 p. s. i.). At the end of 4 hours, the bag of conventional composition was very soft and porous so as to be unfit for use. The bag embodying this invention showed no appreciable deterioration after 16 hours exposure. When two other bags were tested in steam at 200 p. s. i., the bag of conventional formulation was soft and porous after 1 hour and practically disintegrated after 4 hours exposure. The bag embodying this invention showed no deterioration after 1 hour and only slight porosity after 4 hours and did not fail entirely until it had been subjected to the steam for 8 hours.

Similarly improved steam resistance is obtained using other acrylic nitrile polymers and variations and modifications may be effected within the spirit and scope of the invention as defined in the appended claims.

I claim:

1. The method of making a rubbery composition for use in steam-resistant articles, which method comprises mixing together from ½ to 10 parts by weight of an unvulcanized vulcanizable rubbery polymer made by polymerizing a monomeric material comprising predominantly a chlorobutadiene-1,3 containing from 1 to 2 chlorine atoms attached in the 2,3 position, and from ½ to 10 parts by weight of an unvulcanized vulcanizable rubbery copolymer of a butadiene hydrocarbon with a lesser amount by weight of an acrylic nitrile having the structure

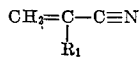

wherein $R_1$ is a member of the class consisting of hydrogen and a methyl group and thereafter blending the resulting mixture with from 80 to 99 parts by weight of unvulcanized vulcanizable rubbery copolymer of from 80 to 99½ parts by weight of an isoolefin having from 4 to 7 carbon atoms with ½ to 20 parts by weight of an open-chain conjugated diolefin having from 4 to 8 carbon atoms.

2. The method of making a steam-resistant rubbery article, which method comprises mixing together ½ to 10 parts by weight of an unvulcanized vulcanizable rubbery polymer made by polymerizing a monomeric material comprising predominantly chloroprene, and from ½ to 10 parts by weight of an unvulcanized vulcanizable rubbery copolymer of from 55 to 80 parts by weight of a butadiene-1,3 hydrocarbon with from 20 to 45 parts by weight of an acrylic nitrile having the structure

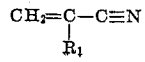

wherein $R_1$ is a member of the class consisting of hydrogen and a methyl group, mixing the resulting mixture with from 80 to 99 parts by weight of an unvulcanized vulcanizable rubbery copolymer of from 80 to 99½ parts by weight of isobutylene with from ½ to 20 parts by weight of isoprene and with a vulcanizing agent, and thereafter vulcanizing the composition.

3. The method of making a steam-resistant rubbery article, which method comprises mixing together from ½ to 10 parts by weight of unvulcanized rubbery polychloroprene and from ½ to 10 parts by weight of an unvulcanized rubbery copolymer of from 55 to 80 parts by weight of butadiene-1,3 with from 20 to 45 parts by weight of acrylonitrile, blending the resulting mixture with from 80 to 99 parts by weight of an unvulcanized rubbery copolymer of from 80 to 99½ parts by weight of isobutylene with from ½ to 20 parts by weight of isoprene and with a vulcanizing agent, and thereafter vulcanizing the resulting composition.

DONALD V. SARBACH.

REFERENCES CITED

The following references are of record in the file of this patent:

UNITED STATES PATENTS

| Number | Name | Date |
| --- | --- | --- |
| 2,305,412 | Frolich et al. | Dec. 15, 1942 |
| 2,332,194 | Beekley et al. | Oct. 19, 1943 |
| 2,467,322 | Lightbown et al. | Apr. 12, 1949 |
| 2,482,600 | Sarbach | Sept. 20, 1949 |
| 2,519,231 | Crawford et al. | Aug. 15, 1950 |
| 2,547,605 | Signer et al. | Apr. 3, 1951 |
| 2,557,642 | Dudley | June 19, 1951 |

FOREIGN PATENTS

| Number | Country | Date |
| --- | --- | --- |
| 513,521 | Great Britain | Oct. 16, 1939 |
| 578,298 | Great Britain | June 24, 1946 |

OTHER REFERENCES

Garvey et al., pp. 209–211, March 1944, Ind. and Eng. Chem.